(12) United States Patent
Green et al.

(10) Patent No.: US 8,443,971 B1
(45) Date of Patent: *May 21, 2013

(54) DECORATIVE CASE

(75) Inventors: Brittany Green, Pittsburgh, PA (US);
Gabriel Roth, Pittsburgh, PA (US);
Joshua T. Space, Pittsburgh, PA (US)

(73) Assignee: Casepops LLC, Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/339,802

(22) Filed: Dec. 29, 2011

Related U.S. Application Data

(63) Continuation of application No. 13/294,762, filed on Nov. 11, 2011.

(51) Int. Cl.
*B65D 85/00* (2006.01)

(52) U.S. Cl.
USPC .................................. 206/320; 206/459.5

(58) Field of Classification Search
USPC ............. 206/457, 459.5, 701, 724, 320, 576, 206/758
See application file for complete search history.

(56) References Cited

U.S. PATENT DOCUMENTS

| | | | |
|---|---|---|---|
| 1,526,711 A | 2/1925 | Kroff et al. | |
| 5,878,882 A * | 3/1999 | Kohagura | 206/379 |
| 7,206,618 B2 | 4/2007 | Latto et al. | |
| 7,697,280 B2 | 4/2010 | Wang | |
| 7,698,836 B2 | 4/2010 | Schmelzer et al. | |
| 7,775,355 B1 | 8/2010 | Hood | |
| 8,124,216 B2 * | 2/2012 | Antonini | 428/172 |
| 2001/0002003 A1 * | 5/2001 | Kuzdak et al. | 206/38.1 |
| 2004/0251286 A1 | 12/2004 | Badillo | |
| 2005/0139498 A1 * | 6/2005 | Goros | 206/320 |
| 2007/0228099 A1 | 10/2007 | Beda | |
| 2008/0233326 A1 | 9/2008 | Hegemier et al. | |
| 2009/0034774 A1 | 2/2009 | Lowry, Jr. | |
| 2009/0059481 A1 * | 3/2009 | Taylor | 361/679 |
| 2009/0084705 A1 * | 4/2009 | Justiss | 206/724 |
| 2009/0124308 A1 | 5/2009 | Lee | |
| 2009/0126839 A1 * | 5/2009 | Matsuura et al. | 150/165 |

(Continued)

FOREIGN PATENT DOCUMENTS

| | | |
|---|---|---|
| GB | 2381986 A | 5/2003 |
| JP | 9321847 A | 12/1997 |

OTHER PUBLICATIONS

Samples of Digicom iCover iPhone product.
Samples of SmallWorks BrickCase for iPhone 4 product.
"With Barnacles™, personalization is a snap!" website: http://buybarnacles.com/; retrieved Mar. 6, 2012.

(Continued)

*Primary Examiner* — Jacob K Ackun
(74) *Attorney, Agent, or Firm* — Buchanan Ingersoll & Rooney PC

(57) ABSTRACT

A case for a portable electronic device that includes a first section having a first plurality of apertures, a second section having a second plurality of apertures, and a plurality of decorative pieces that have a base. The second section is slideable in relation to the first section such that the second plurality of apertures overlaps the first plurality of apertures when the first section and the second section are in a first position or in a second position. The base of each decorative piece is sized and configured to pass through a first overlap region when the first and second sections are in a first position and the base is held in a locked engagement in a second overlap region when the first and second sections are in a second position.

16 Claims, 21 Drawing Sheets

U.S. PATENT DOCUMENTS

| | | |
|---|---|---|
| 2010/0072334 A1 | 3/2010 | Le Gette et al. |
| 2010/0096284 A1 | 4/2010 | Bau |
| 2010/0243516 A1* | 9/2010 | Martin et al. .................. 206/701 |
| 2011/0042265 A1* | 2/2011 | Hofmann et al. .............. 206/701 |
| 2011/0049005 A1* | 3/2011 | Wilson et al. ................. 206/701 |
| 2011/0259664 A1* | 10/2011 | Freeman ....................... 181/202 |
| 2012/0103844 A1* | 5/2012 | Piedra et al. .................. 206/320 |

OTHER PUBLICATIONS

Barnacles™ Product Support; website: http://www.buybarnacles.com/support/ retrieved Mar. 6, 2012.

Barnacles™ cases; website: http://www.buybarnacles.com/cases.html?limit=all retrieved Mar. 6, 2012.

\* cited by examiner

DECORATIVE CASE

CROSS-REFERENCE TO RELATED APPLICATIONS

This application is a continuation of U.S. patent application Ser. No. 13/294,762, filed Nov. 11, 2011 and claims the benefit thereof. The entirety of U.S. patent application Ser. No. 13/294,762 is incorporated by reference herein.

BACKGROUND OF THE INVENTION

1. Field of the Invention

The present invention relates to a case or cover for an item that has decorative accessories.

2. Description of the Related Art

With the proliferation of electronic devices in modern society, so too has demand increased for individualization of these devices. One way to individualize a device is to have a case or cover that includes decorative items showing an owner's specific interests. These interests may include branded products, sports teams, etc.

A common way of decorating such a case or cover is to use adhesives to apply an appropriately shaped bead or similar object. However, the use of adhesives to apply decorative items has drawbacks. The adhesive may wear off after time particularly if a decorative item is removed and replaced. Additionally, adhesives may not hold decorative items securely enough. This can be an issue with a case or cover that is held on a user's body where body movements or incidental contact can cause the decorative items to come loose. Similarly, systems consisting of a peg/post and a receptacle for applying decorative items may have the same problems.

Therefore there is a need for a case or cover that allows for removal and replacement of decorative accessories based on a user's tastes while securely attaching the decorative accessories.

SUMMARY OF THE INVENTION

Disclosed herein is a case for a portable electronic device that comprises a first section having a first plurality of apertures, a second section having a second plurality of apertures, and a plurality of decorative pieces. The second section is slideable in relation to the first section such that the second plurality of apertures overlaps the first plurality of apertures when the first section and the second section are in a first position or in a second position. Each decorative piece has a base and the base of each decorative piece is sized and configured to pass through a first overlap region defined by an aperture of the first plurality of apertures and an aperture of the second plurality of apertures when the first and second sections are in the first position.

Further, the base is sized and configured such that the base is held in a locked engagement in a second overlap region defined by an aperture of the first plurality of apertures and an aperture of the second plurality of apertures when the first and second sections are in the second position.

In another preferred embodiment the plurality of decorative pieces each have a top portion and the top portion is sized and configured such that the top portion is not able to pass through either a first overlap region or a second overlap region.

In yet another preferred embodiment the case further comprises an indicator attached to the first section or the second section that indicates when the first and the second section are in the first position.

In still another preferred embodiment each of the second plurality of apertures of the second section have a detent, and wherein the base of each of the decorative pieces is sized and configured to fit at least partially within the detent.

In a further preferred embodiment the case further comprises a slide grip that enables the first and second sections to slide in relation to each other when a force is applied to the slide grip.

In yet a further preferred embodiment the first section or the second section has a camera aperture.

In still a further preferred embodiment the case further comprises a rim around a perimeter of the first section or the second section and the rim is sized and configured to engage and hold the portable electronic device such that the portable electronic device is accessible to a user.

In another preferred embodiment the first section and the second section are lockable in the second position via a locking mechanism.

In yet another preferred embodiment the locking mechanism comprises a post on an inner surface of the first section and a tab on an inner surface of the second section, wherein the tab has at least one indentation that fits at least partially around the post.

In a further preferred embodiment each of the second plurality of apertures of the second section have a teardrop shape and each of the first plurality of apertures of the first section have a circular shape.

Further disclosed herein is a case that comprises a first section having a first plurality of apertures, a second section having a second plurality of apertures, a rim around a perimeter of the case, and a plurality of decorative pieces each having a base. The second section is slideable in relation to the first section such that the second plurality of apertures overlap the first plurality of apertures when the first section and the second section are in a first position or in a second position and the rim is sized and configured to engage and hold an object.

Further, the base of each decorative piece is sized and configured to pass through a first overlap region defined by an aperture of the first plurality of apertures and an aperture of the second plurality of apertures when the first and second sections are in the first position and the base being sized and configured such that the base is held in a locked engagement in a second overlap region defined by an aperture of the first plurality of apertures and an aperture of the second plurality of apertures when the first and second sections are in the second position.

In another preferred embodiment the object is selected from the group consisting of a book, a diary, a portfolio, and a journal.

Additionally disclosed herein is a decorative accessory for a portable electronic device case that includes an accessory having a base, a top, and a middle, the top having a larger perimeter than the base.

Further, the base of the accessory is sized and configured to fit through an aperture in a first section of a portable electronic device case and an aperture in a second section of the portable electronic device case when the first section and the second section of the portable electronic device case are in a first position and the accessory is held in a locked engagement when the first section and the second section of the portable electronic device case are in a second position. In addition, the top has an outer surface and an indicia on the outer surface.

In another preferred embodiment the top has a ridge that extends in a direction opposite a decorative face of the top that fits within an aperture in the first section of the electronic device case.

In still another preferred embodiment the base has a circular shape or a rectangular shape.

Other details, objects, and advantages of the invention will become apparent as the following description of certain present preferred embodiments thereof proceeds.

BRIEF DESCRIPTION OF THE FIGURES

In the accompanying drawings we have shown certain present preferred embodiments of our electronic device case in which.

DESCRIPTION OF THE PREFERRED EMBODIMENTS

Figure 1:
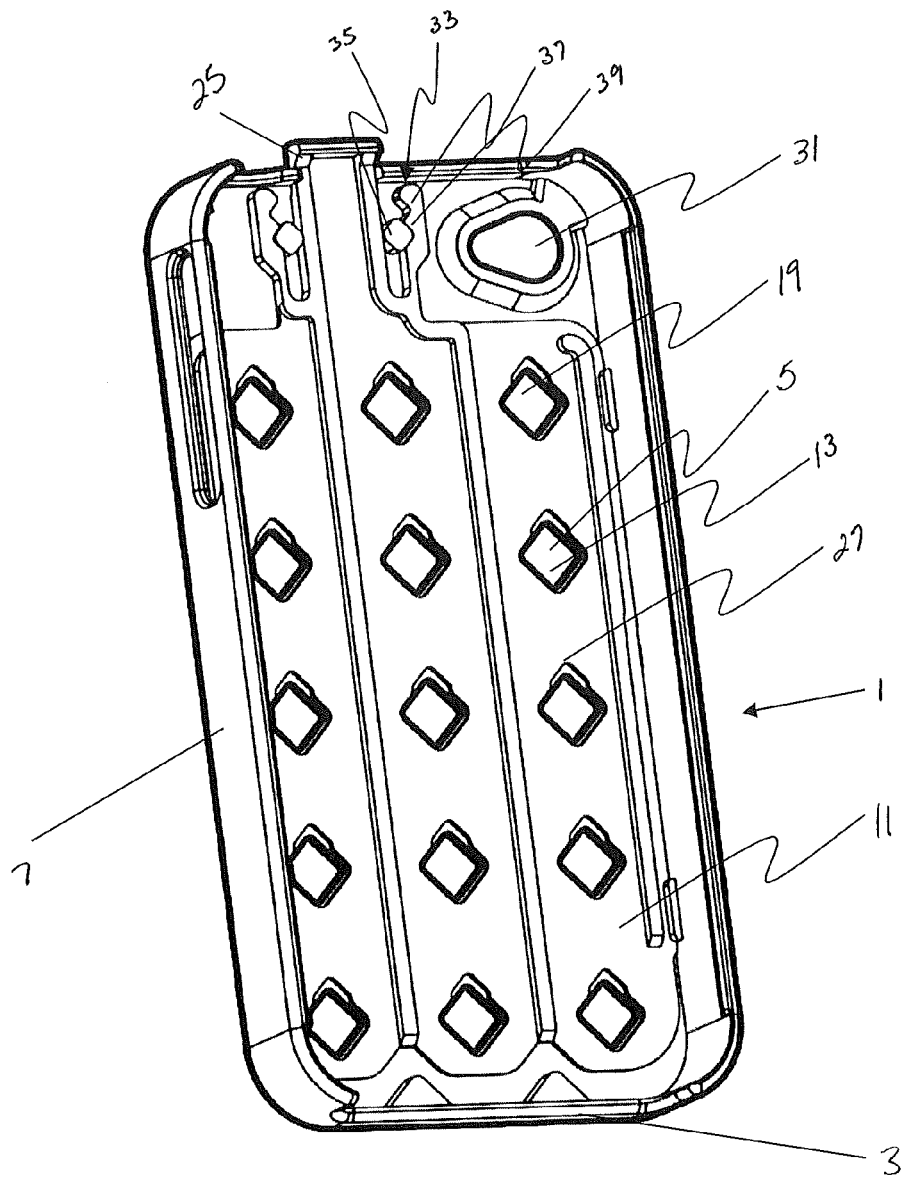
FIG. 1 is a front perspective view of a present preferred embodiment of our decorative case in a first position.

Referring to FIGS. 1-13, a decorative case 1 comprises a first section 3 that has a first plurality of apertures 5 and a second section 11 that has a second plurality of apertures 13, and a plurality of decorative pieces or accessories 15. As shown in FIGS. 1-13, the first plurality of apertures 5 have a diamond shape and the second plurality of apertures have a tiered diamond shape although other corresponding shapes and configurations can also be used. These aperture shapes allow for orientation control of decorative pieces to the first section and passively communicates about orientation choice. The second section 11 is slideable in relation to the first section 3 such that the second plurality of apertures 13 overlap the first plurality of apertures 5 when the first section 3 and the second section 11 are in a first position shown in FIGS. 1, 2, 3, 10, 12 or in a second position shown in FIGS. 4, 5, 6, 7, 8, 9, 11, 13.

Figure 2:
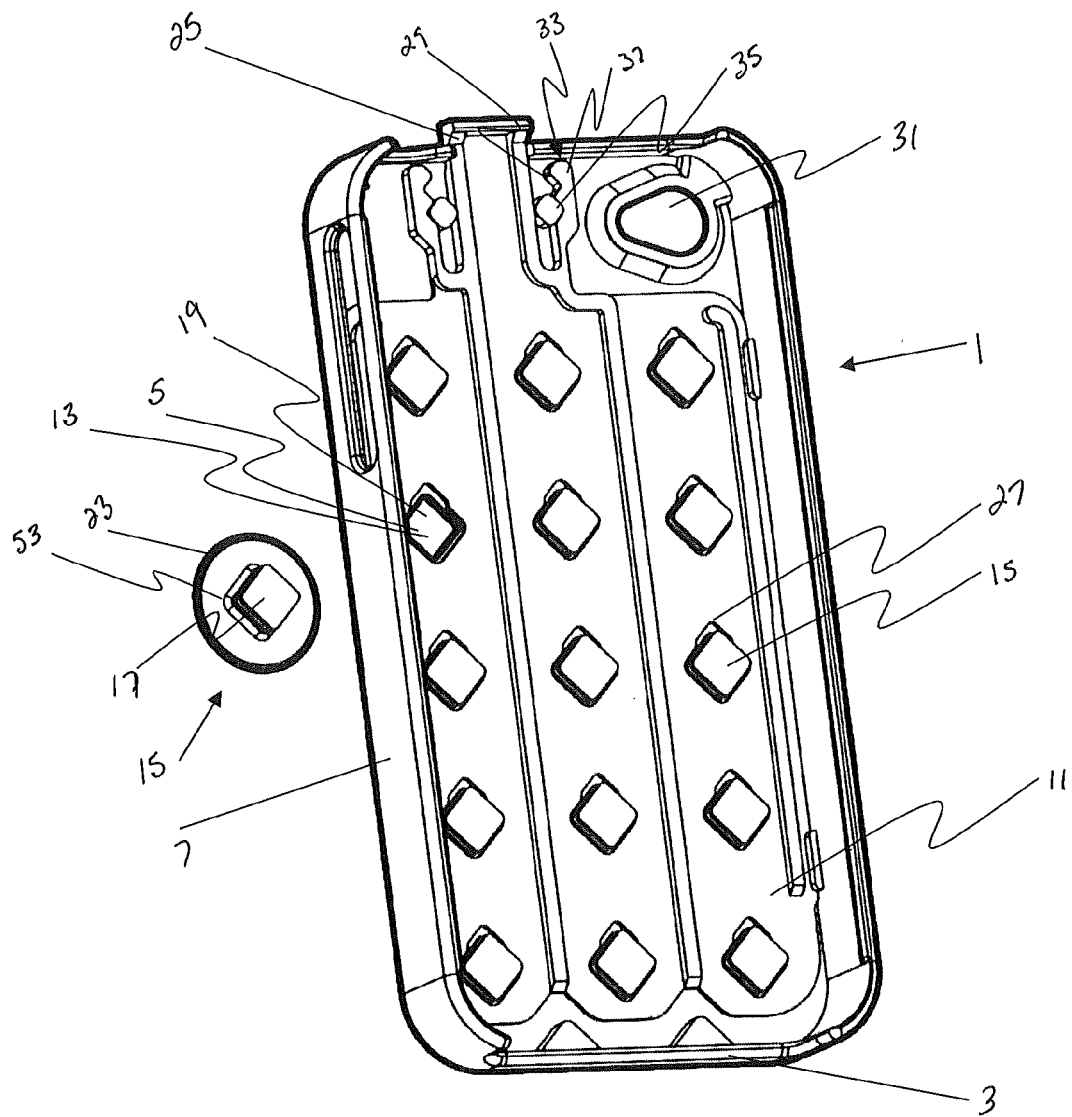
FIG. 2 is another front perspective view of the embodiment of our decorative case shown in FIG. 1 in the first position.
Figure 3:
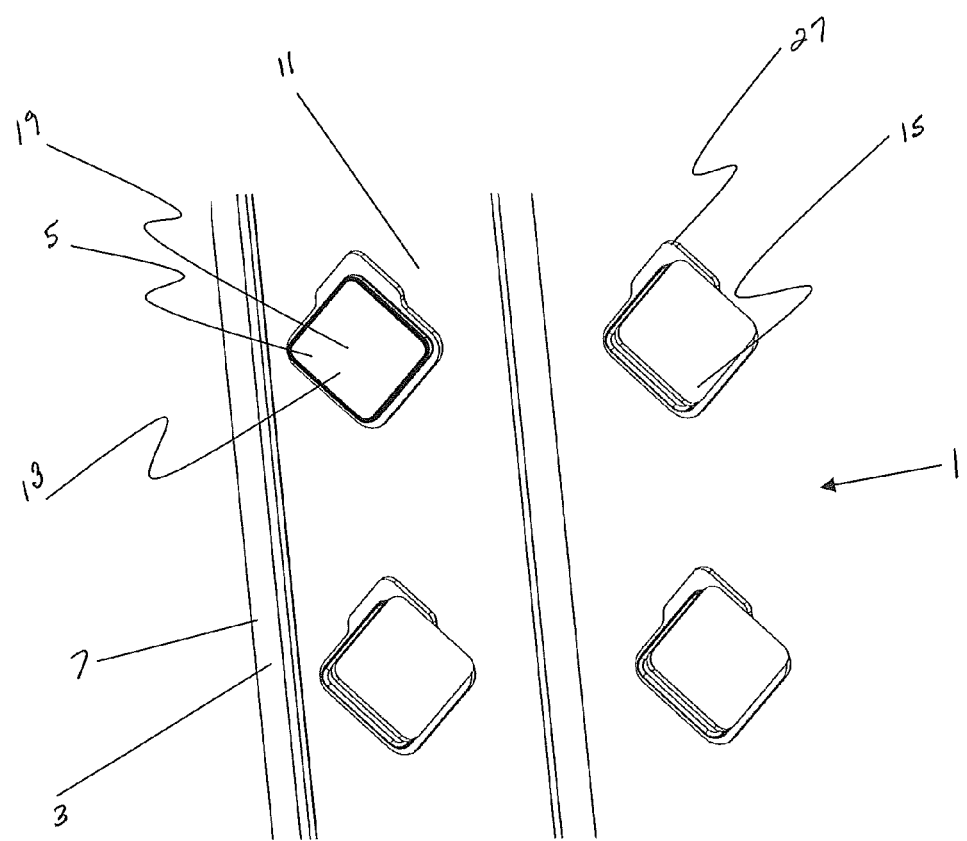
FIG. 3 is a close up view of the embodiment of our decorative case as shown in FIG. 2.
Figure 4:
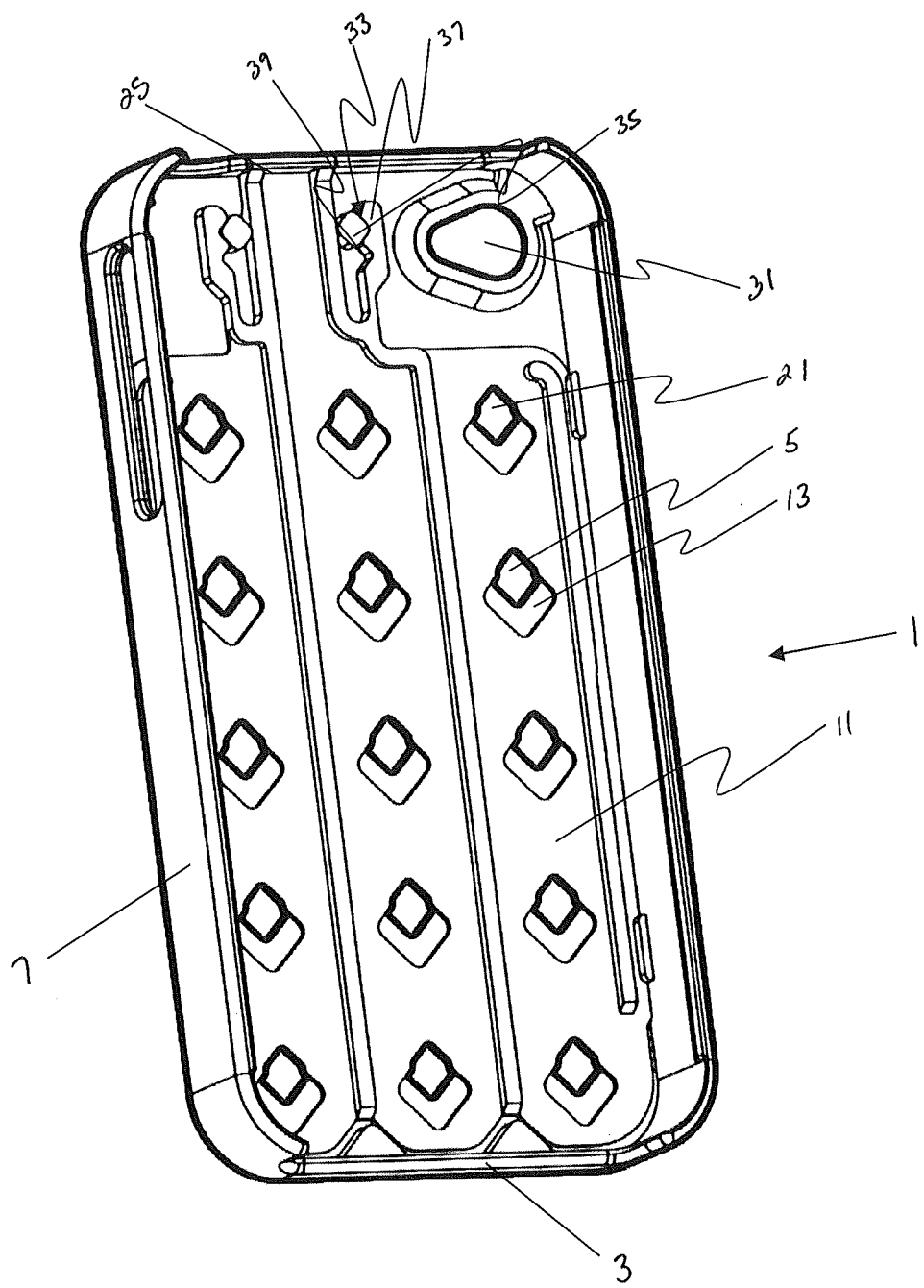
FIG. 4 is a front perspective view of the embodiment of our decorative case shown in FIG. 1 in a second position.
Figure 5:
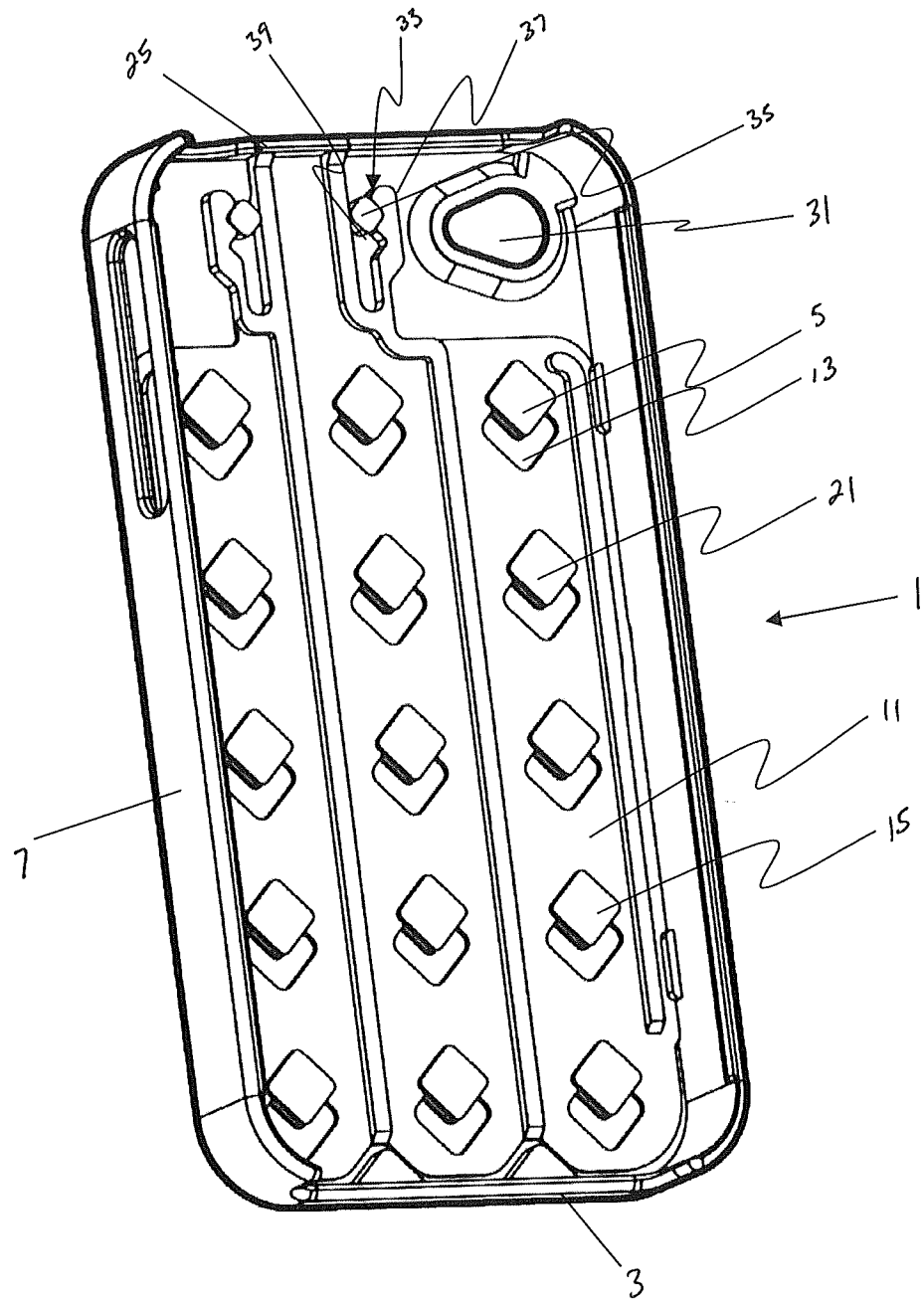
FIG. 5 is another front perspective view of the present preferred embodiment of our decorative case shown in FIG. 1 in the second position.
Figure 6:
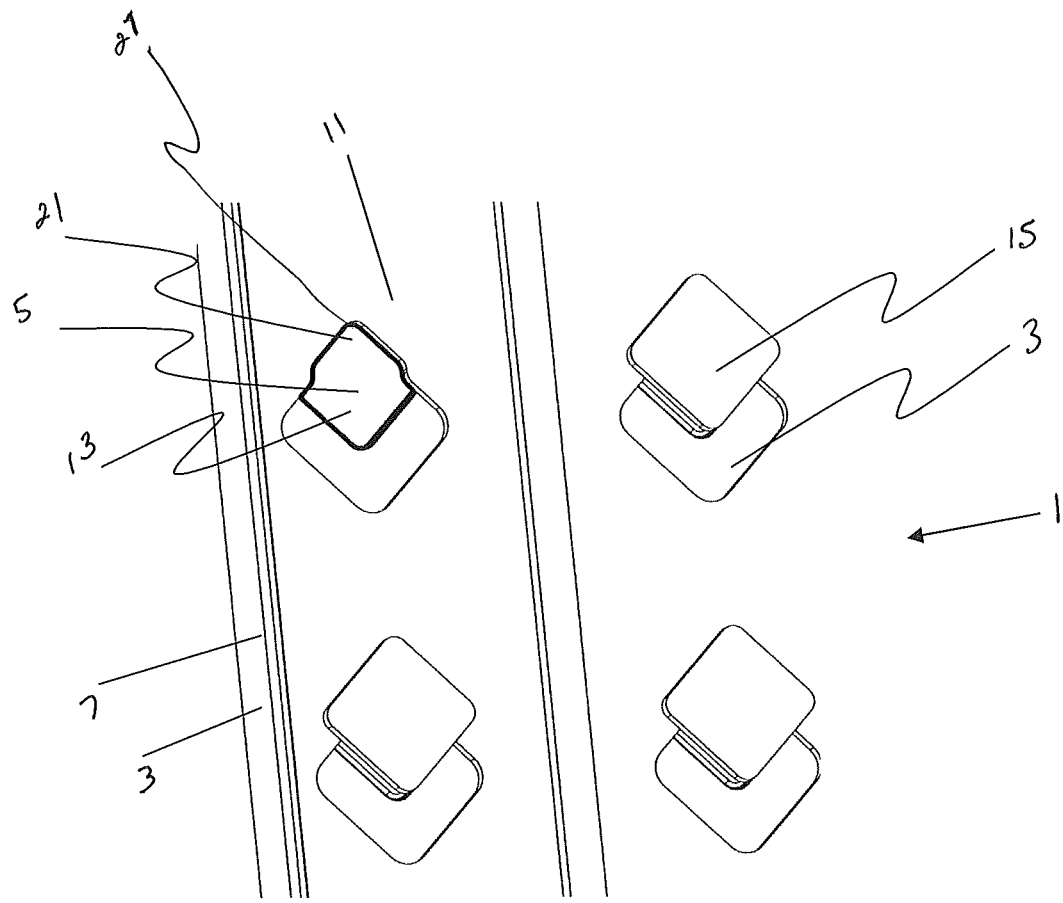
FIG. 6 is a close up view of the embodiment of our decorative case as shown in FIG. 5.
Figure 7:
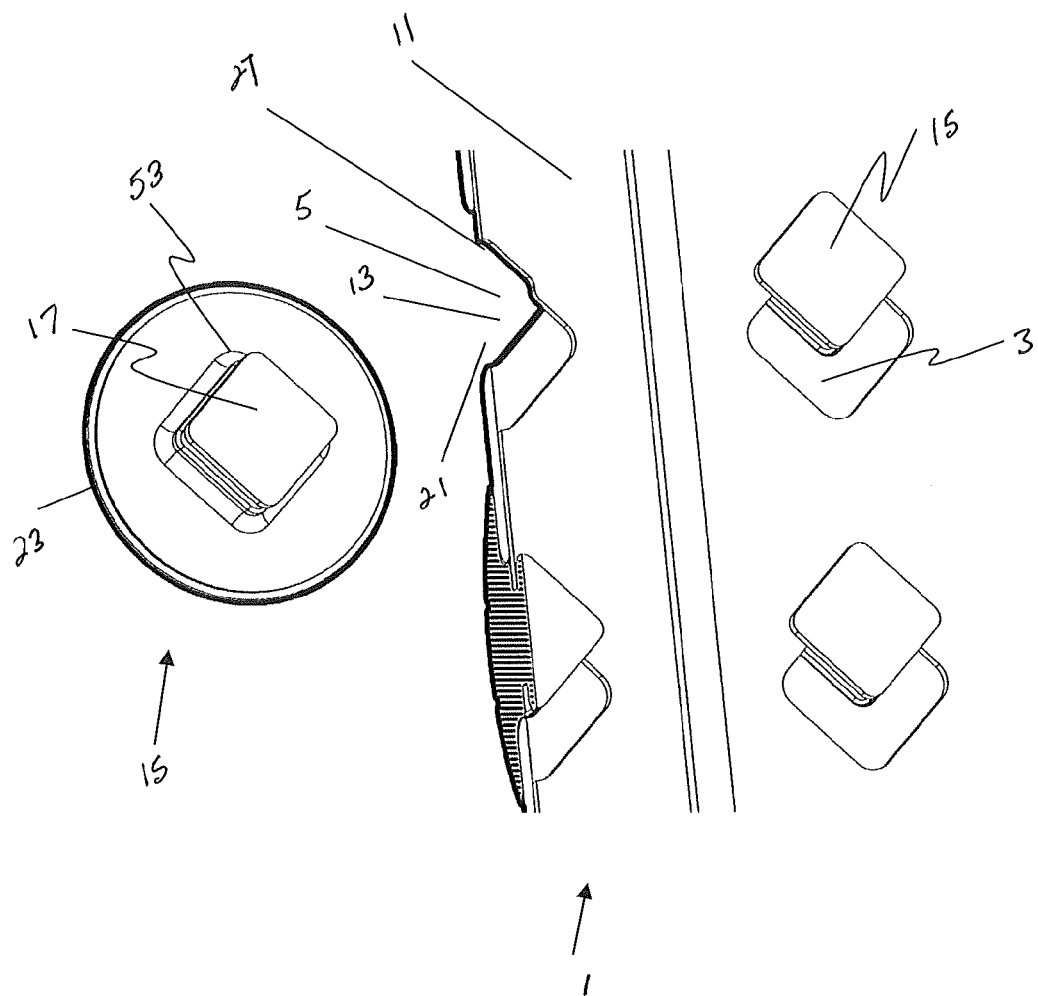
FIG. 7 is a close up and sectional view of the embodiment of our decorative case as shown in FIG. 5.
Figure 8:
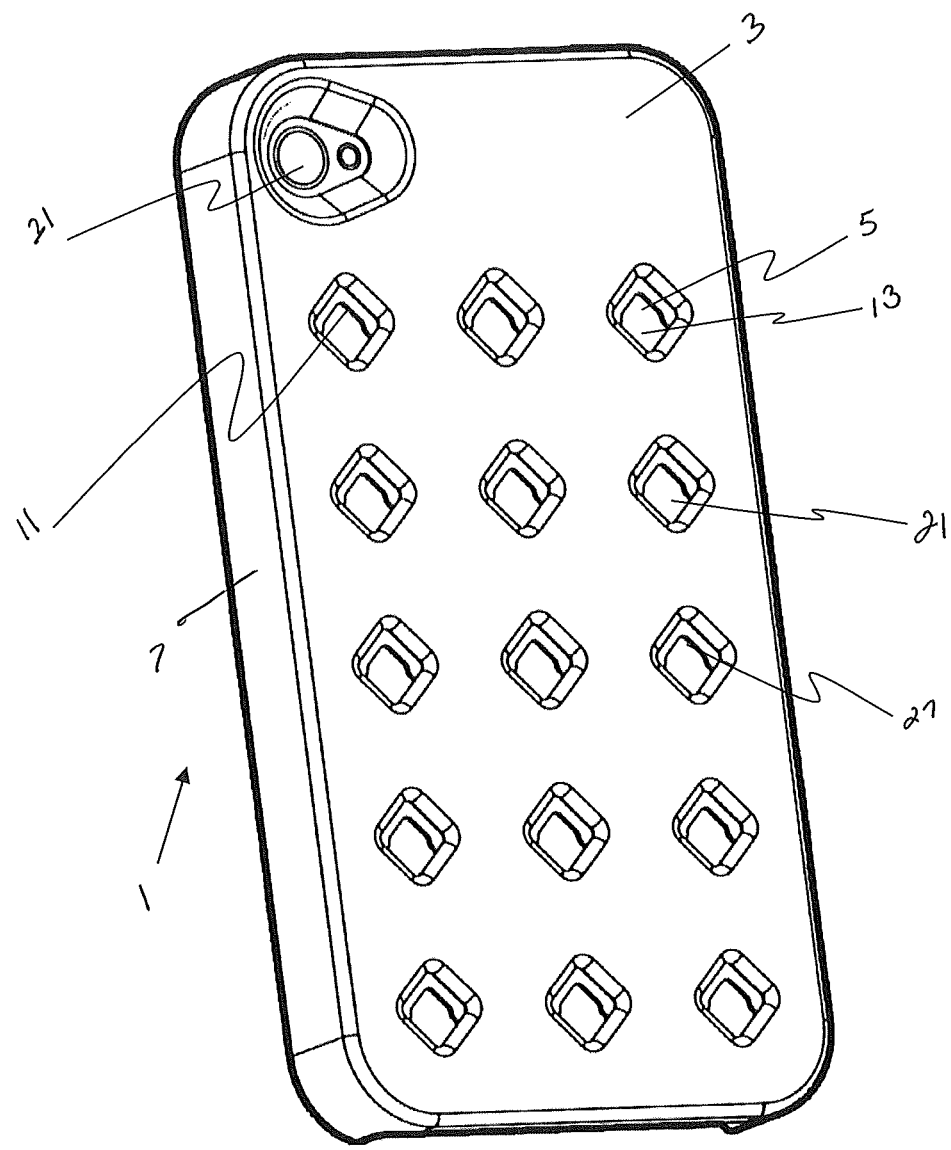
FIG. 8 is a rear perspective view of the preferred embodiment of our decorative case shown in FIG. 1. in the second position.
Figure 12:
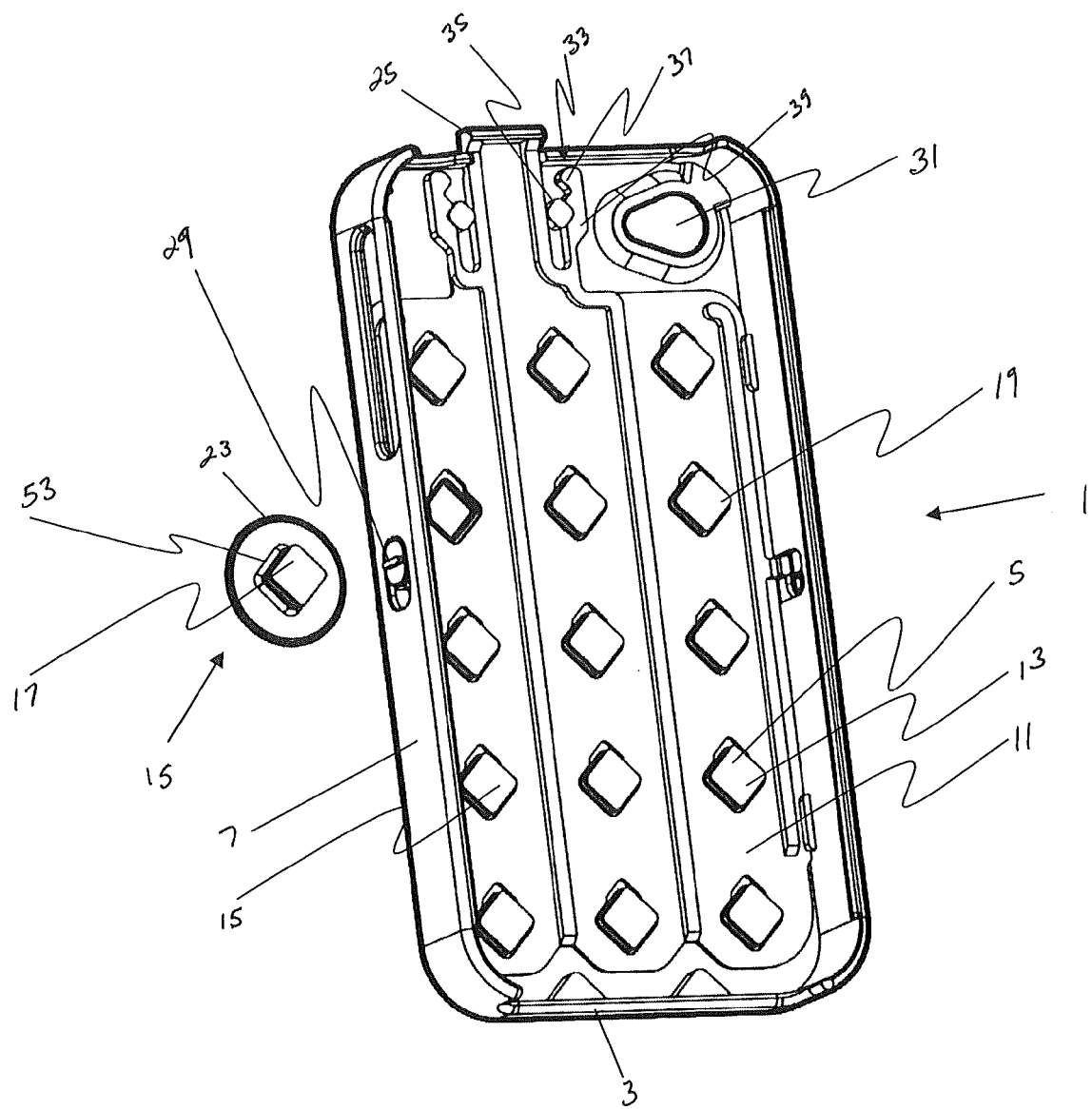
FIG. 12 is a front perspective view of another preferred embodiment of our decorative case in a first position.

Each of the first plurality of apertures 5 of the first section 3 and the second plurality of apertures 13 of the second section 11 have a shape to allow for insertion of a base 17 of a decorative piece 15 through the apertures 5, 13. In addition, each of the decorative pieces 15 also has a top portion 23 that is sized and configured such that the top portion 23 is not able to pass through either the first overlap region 19 or the second overlap region 21. In FIGS. 2 and 12, one decorative piece 15 is removed from the case 1 to better illustrate the overlap region 19 and the apertures 5, 13.

Additionally, each decorative piece 15 has a base 17 and the base 17 of each decorative piece 15 is sized and configured to pass through a first overlap region 19. The first overlap region 19 is defined by an aperture 5 of the first plurality of apertures 5 and an aperture 13 of the second plurality of apertures 13 when the first 3 and second 11 sections are in the first position shown in FIGS. 1, 2, 3, 10, 12. The base 17 is also sized and configured such that the base 17 is held in a locked engagement in a second overlap region 21 defined by an aperture 5 of the first plurality of apertures 5 and an aperture 13 of the second plurality of apertures 13 when the first 3 and second 11 sections are in the second position shown in FIGS. 4, 5, 6, 7, 8, 9, 11, 13. Based on the locked engagement, the base 17 is nested within the apertures 5, 13 and cannot be easily removed unless the first section and second section are placed in the first position. Furthermore, the first overlap region 19 is larger than the second overlap region 21.

Further shown in the preferred embodiment of FIGS. 1-13, the decorative case 1 has a rim 7 around a perimeter of the first section 3. The rim 7 is sized and configured to engage and hold a portable electronic device 9 such that the portable electronic device 9 is accessible to a user. This could include accessibility to a front screen of a device or a keypad of a device. In other embodiments, the rim may be formed as part of the second section or as part of both the first and second section. If the rim is formed as both the first and second section the electronic device may be held or secured based on a cinching action of the first and second sections.

The decorative case 1 may also have an indicator 25 that indicates when the first 3 and the second 11 section are in the first position 12 or the second position 14. The indicator 25 may be formed as an integral part of the second section 11 or the first section 3 and may function as pull and push mechanism for causing the second section 11 or the first section 3 to move from the first position to the second position or vice versa.

Further, the first section 3 and the second section 11 may be lockable in the second position via a locking mechanism 33. The locking mechanism 33 may formed by at least one post 35 on the inner surface of the first section 3 and at least one tab 37 on the inner surface of the second section 11. The tab 37 may have at least one indentation 39 that fits at least partially around the post 35 but still allows the tab 37 to slide forward and backward. The post and tab may also be formed on the opposite sections from what is described above. The locking mechanism may also comprise a spring loaded button that fits through an aperture or similar system. The locking mechanism not only provides for locked engagement of the first and second sections but it may also provide an indexing function that indicates when the first and second section are in the first position or the second position.

Figure 13:
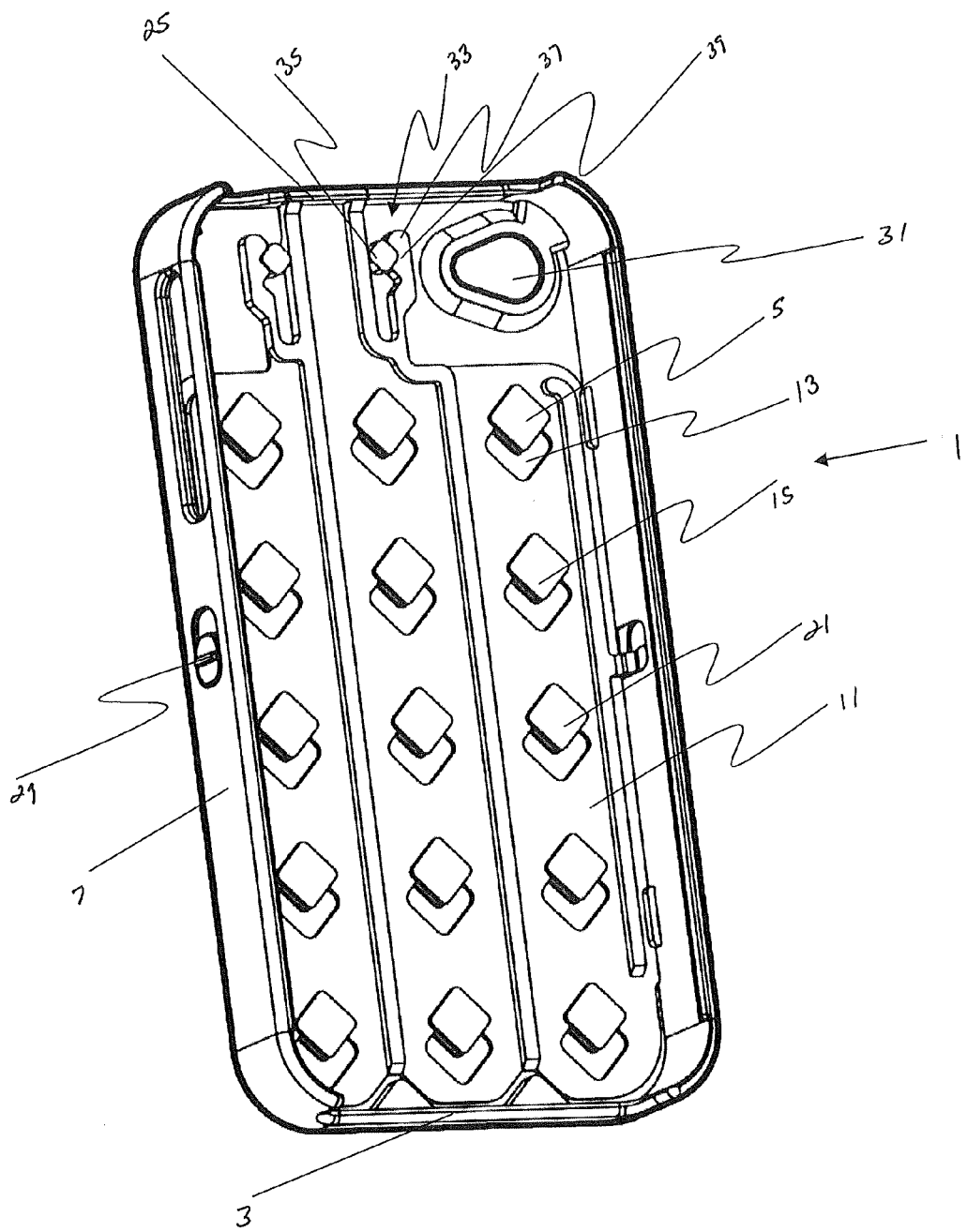
FIG. 13 is a front perspective view of another preferred embodiment of our decorative case in a second position.
Figure 14:
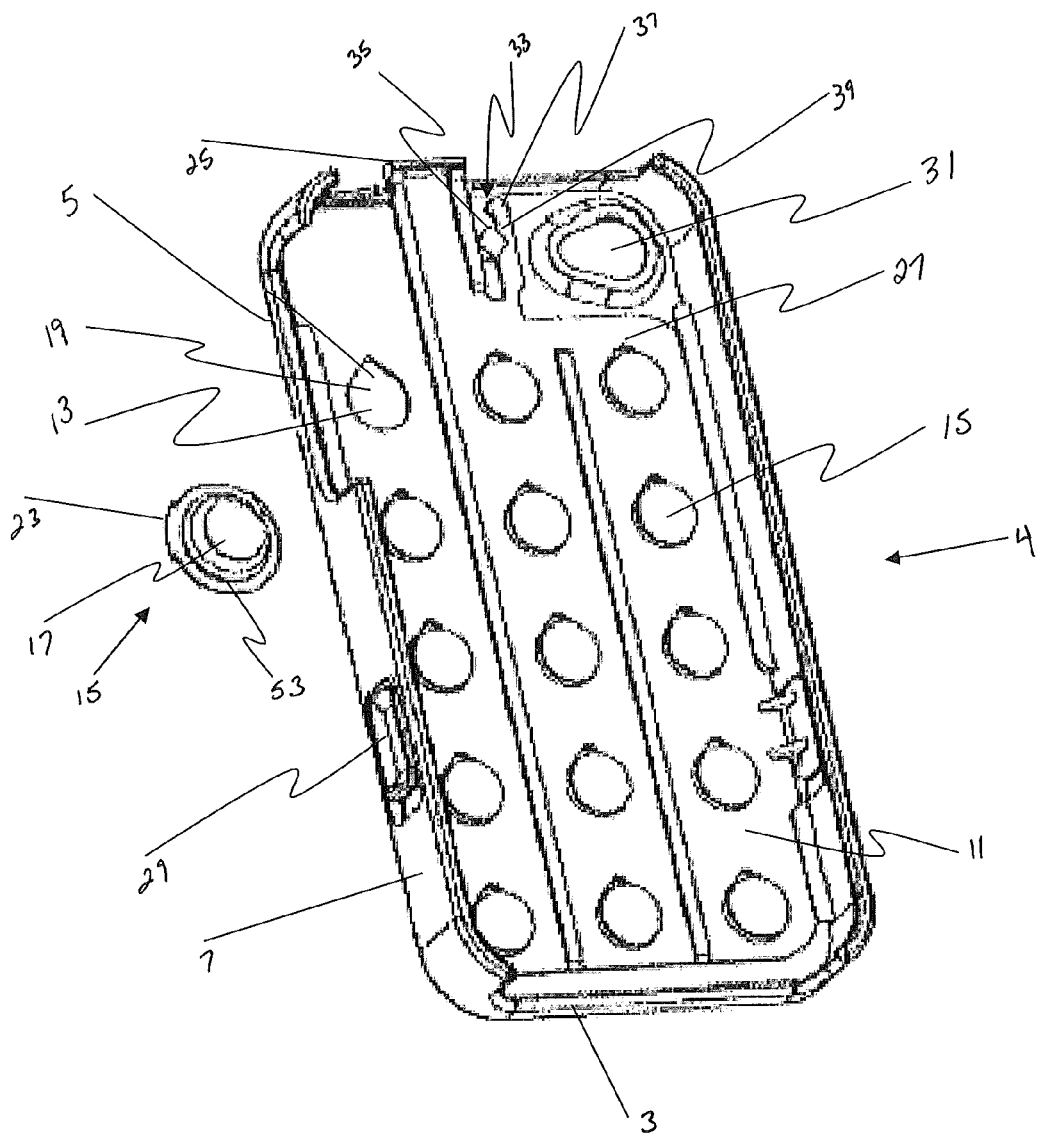
FIG. 14 is a front perspective view of yet another preferred embodiment of our decorative case in a first position.
Figure 15:
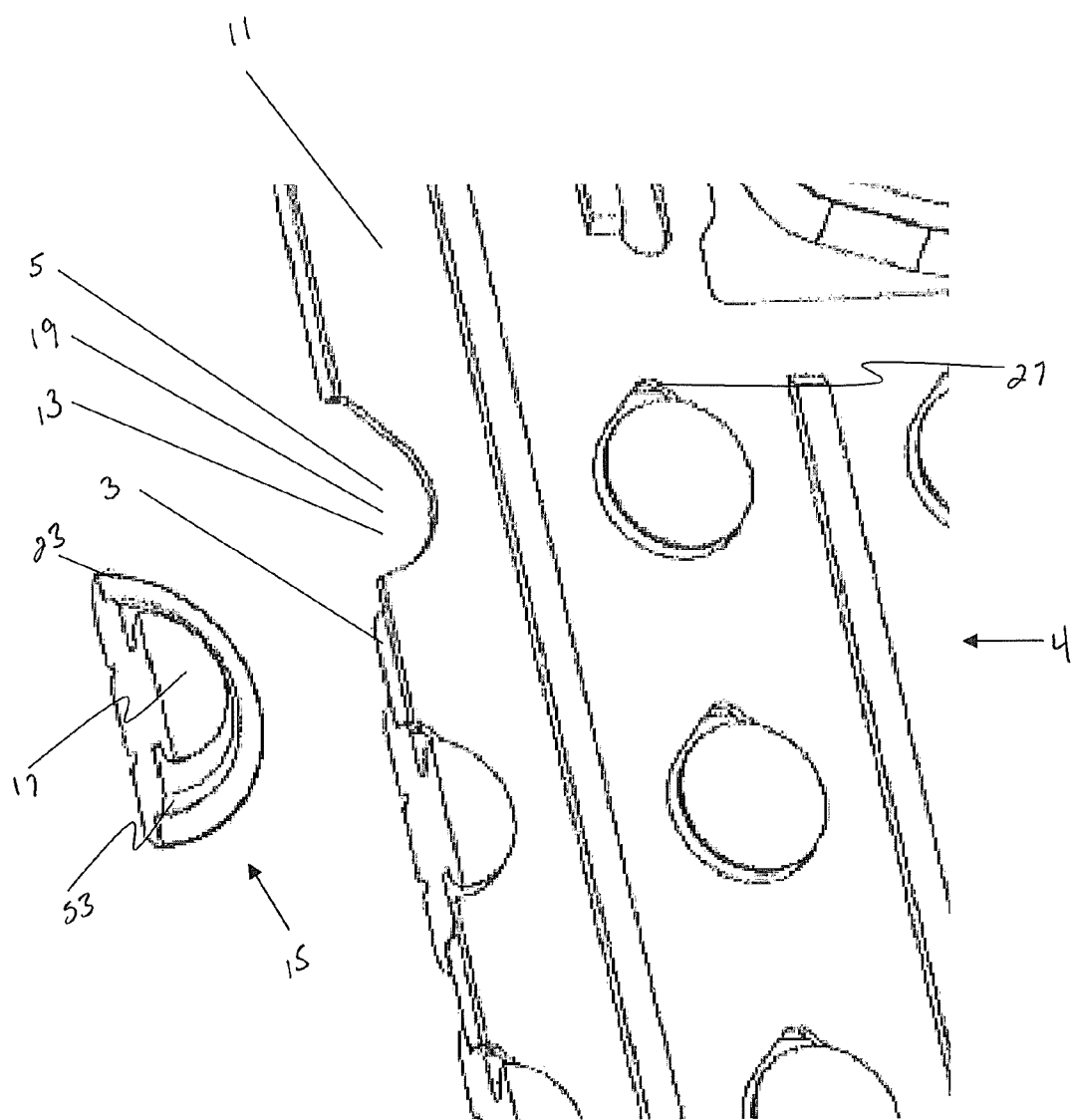
FIG. 15 is a close up and sectional view of the embodiment of our decorative case as shown in FIG. 14.

In addition, as shown in FIGS. 12 and 13, the decorative case 1 may include a slide grip 29. The slide grip 29 may be attached to the second section 11 such that the slide grip enables a user to slide the sections to the first position, shown in FIG. 12, or the second position, shown in FIG. 13, when a force is applied to the slide grip 29. Further, the slide grip 29 may be attached to the second section 11 or the first section 3.

Also shown in the preferred embodiment of FIGS. 1-13, each of the second plurality of apertures 13 of the second section 11 have a detent 27 such that the base 17 of each of the decorative pieces 15 may fit at least partially within the detent 27. The detent 27 allows for the base 17 of a decorative piece 15 to more easily nest within the aperture 13 and provides for secure engagement of the base 17 with the apertures 5, 13. Additionally, the first section 3 and/or the second section 11 may also have a camera aperture 31 for a camera of an electronic device.

Figure 9:
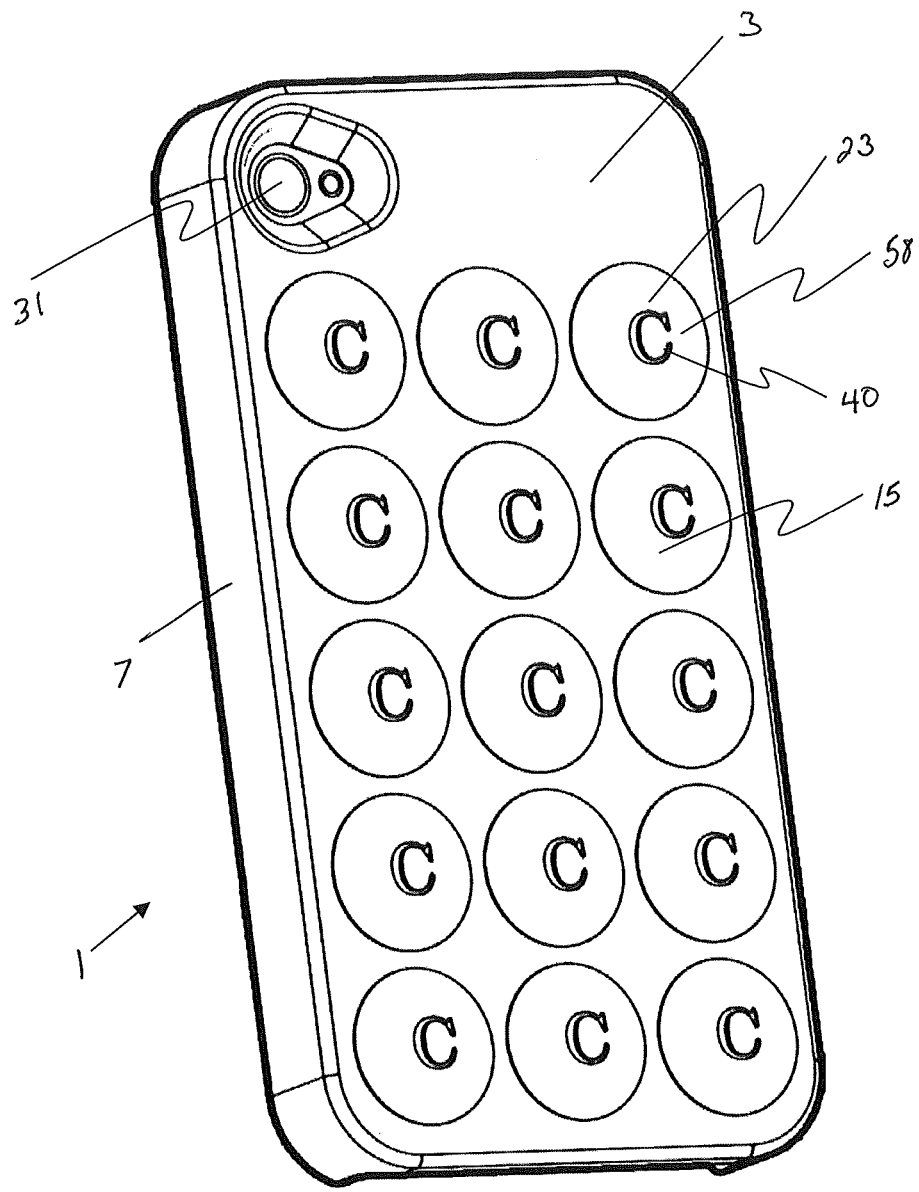
FIG. 9 is a rear perspective view of the preferred embodiment of our decorative case shown in FIG. 1. in the second position with a plurality of decorative accessories in place.
Figure 10:
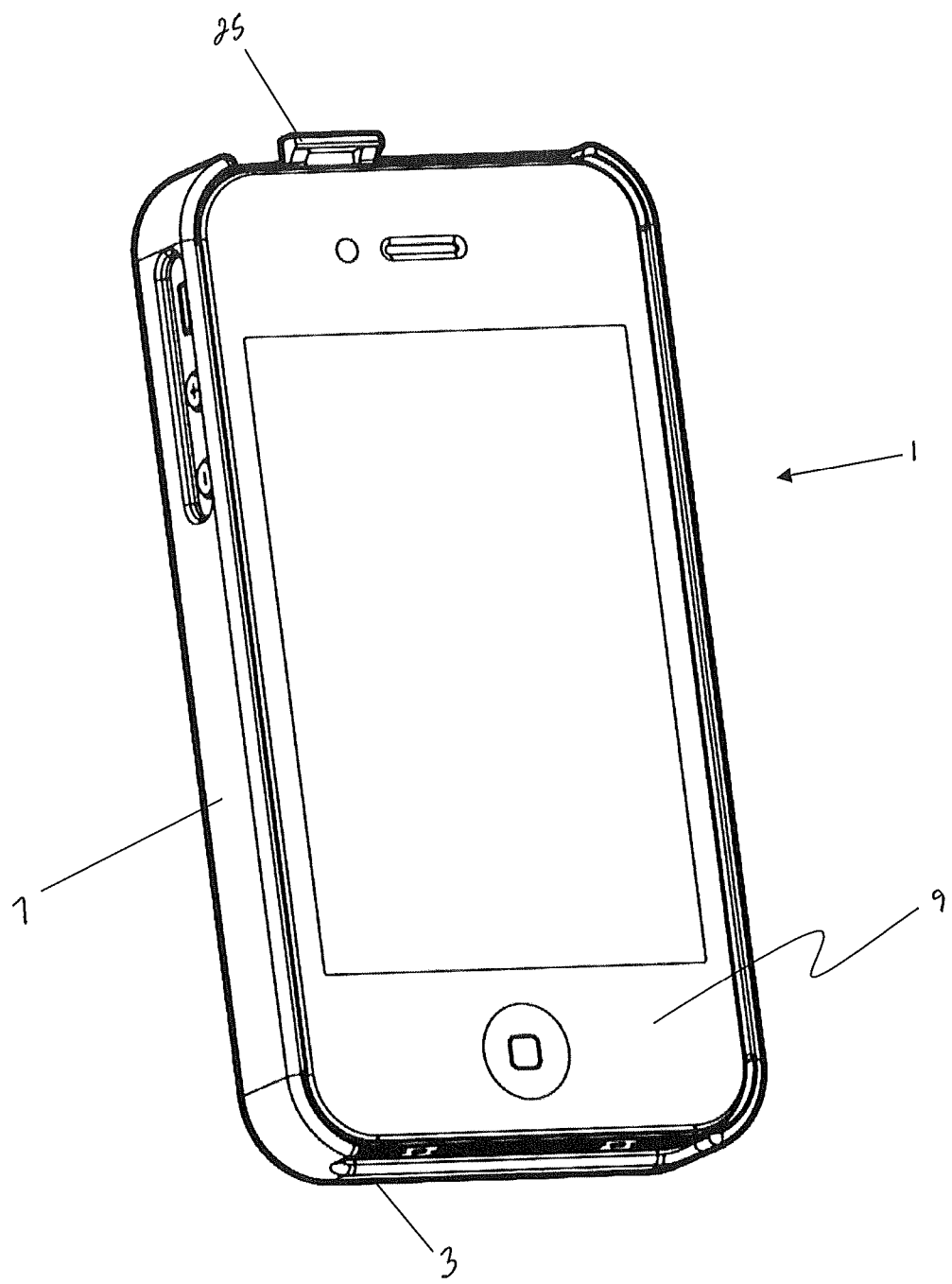
FIG. 10 is a front perspective view of the embodiment of our decorative case shown in FIG. 1 in the first position engaged with an electronic device.
Figure 11:
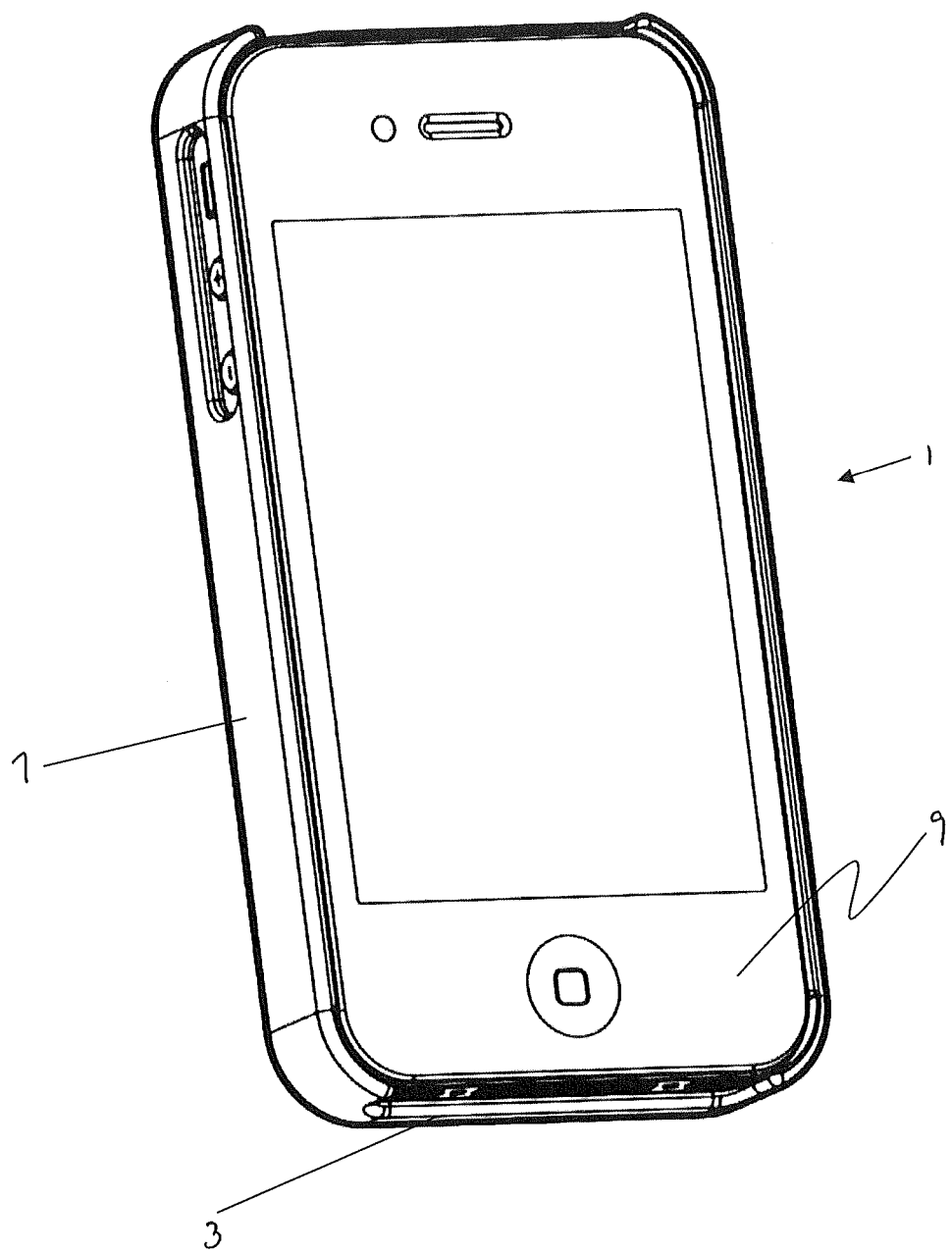
FIG. 11 is a front perspective view of the embodiment of our decorative case shown in FIG. 1 in the second position engaged with an electronic device.

Further, an indicia 40 may appear on a decorative face 58 of the top portion 23 of the decorative pieces 15 as shown in FIG. 9. The indicia may be formed as part of the top portion 23 or it may be printed, painted, adhered, or affixed to the top portion in any known way. The indicia may present a user's affinity for a particular sports team, a product brand, a humorous icon, or any other visual appearance that a user desires. The decorative face 58 of the top portion 23 may also be formed in particularly desired shapes such as gems, sports balls, etc. to suit a particular consumer.

As shown in FIGS. 2, 7, 12, 14, 15, and 18-22 each decorative piece 15 may also have a ridge 53 that extends in a direction opposite that of the decorative face 58 and that fits within an aperture 5 in the first section 3 of the electronic device case. The ridge 53 allows the decorative piece 15 to fit snugly within the decorative case 1 and prevents inadvertent movement of the decorative piece 15. The ridge 53 can also provide a tactile response that allows a user to know that the decorative piece 15 is completely inserted within an aperture. The ridge 53 may be shaped accordingly to fit the apertures 5 of the first section 3.

Figure 16:
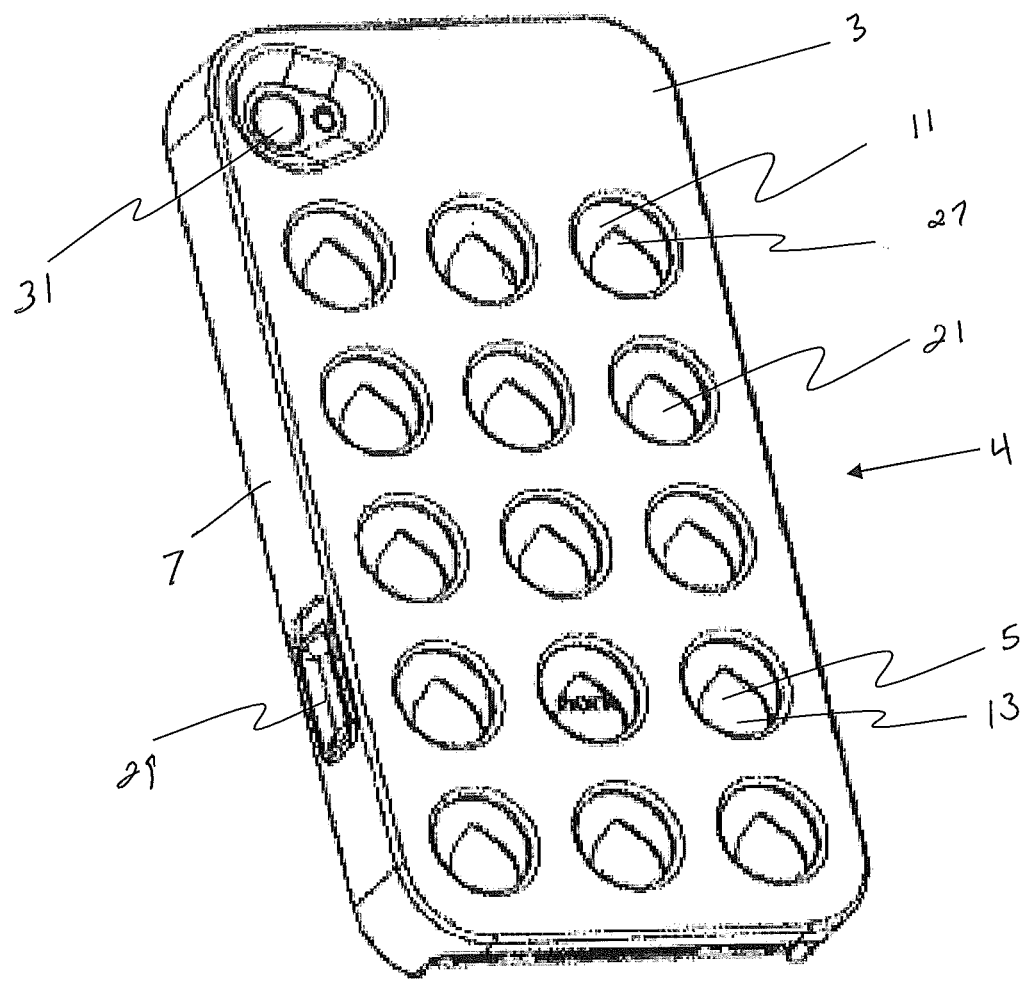
FIG. 16 is a rear perspective view of the preferred embodiment of our decorative case shown in FIG. 14 in a second position.
Figure 17:
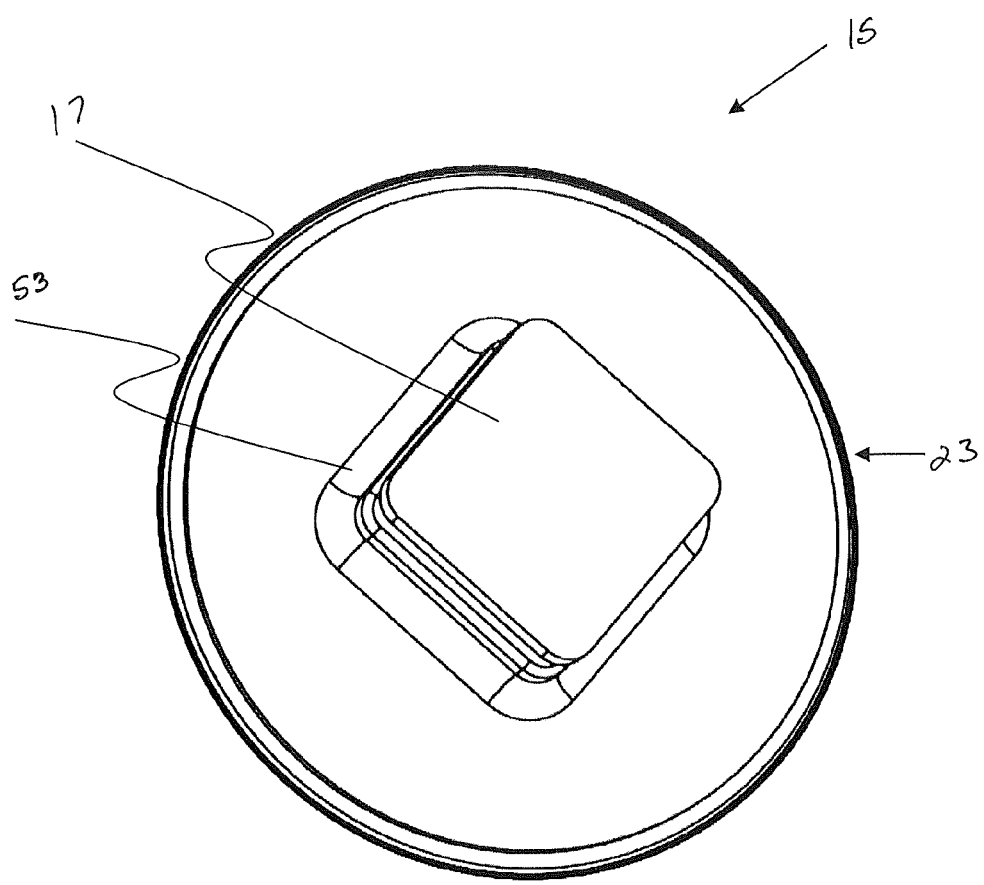
FIG. 17 is a rear perspective view of a preferred embodiment of a decorative accessory of our decorative case.
Figure 18:
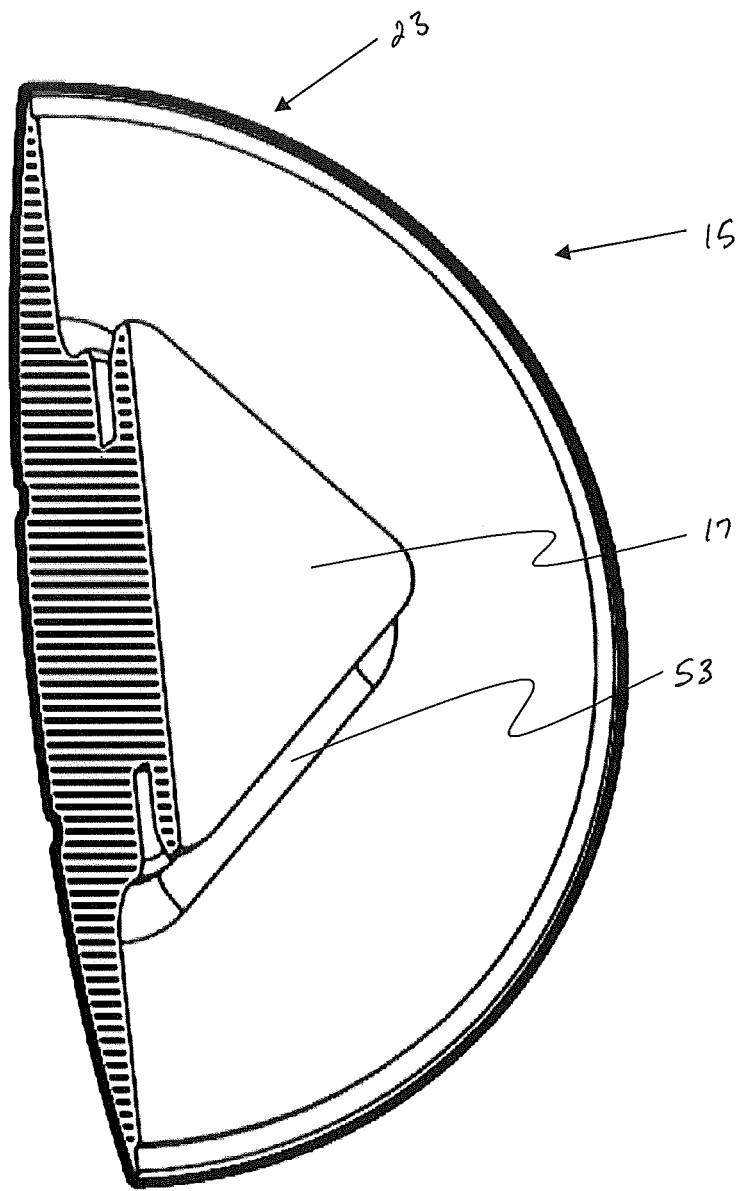
FIG. 18 is a sectional view of the preferred embodiment of the decorative accessory shown in FIG. 17.
Figure 19:
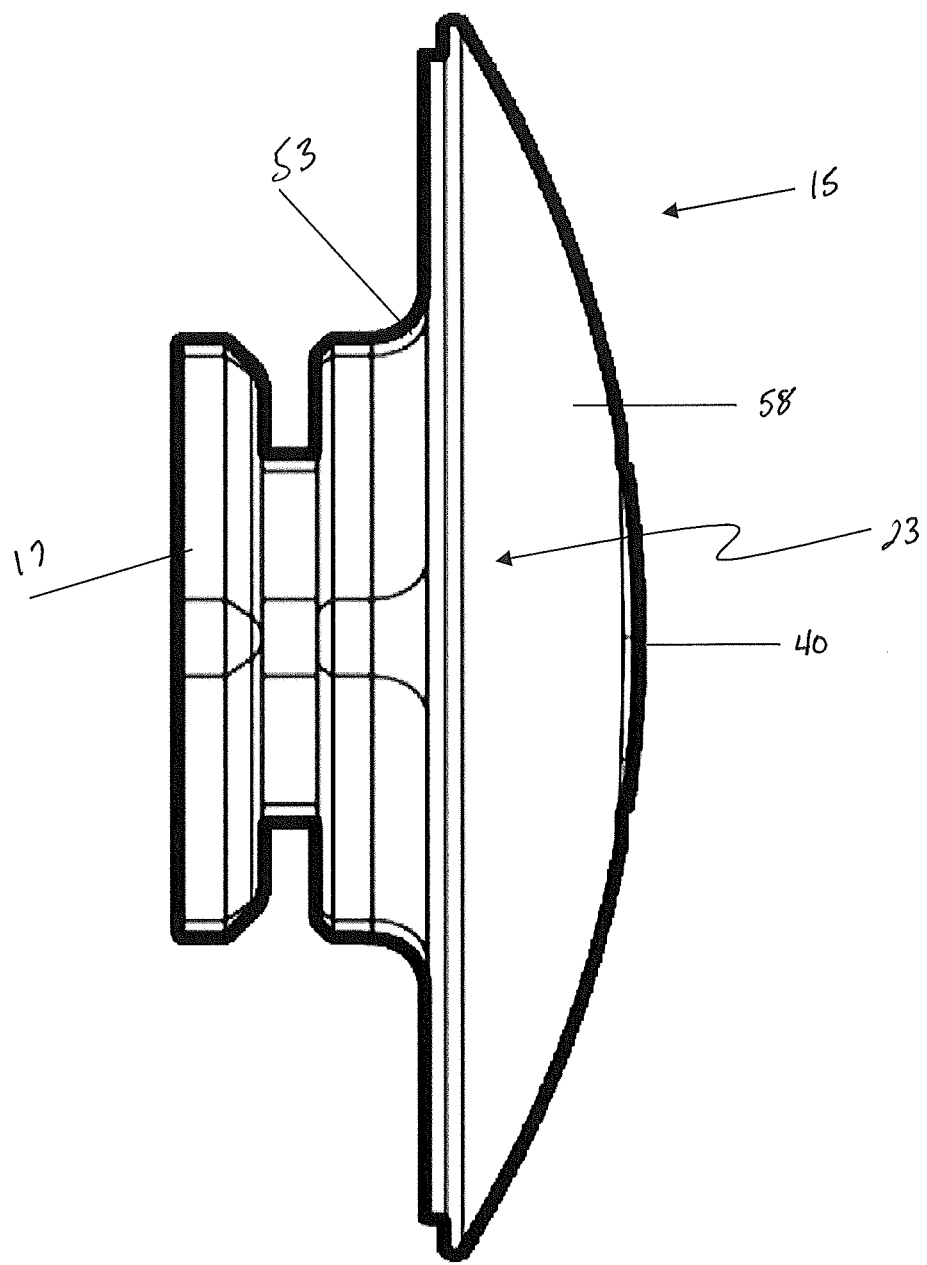
FIG. 19 is a side view of the preferred embodiment of the decorative accessory shown in FIG. 17.
Figure 20:
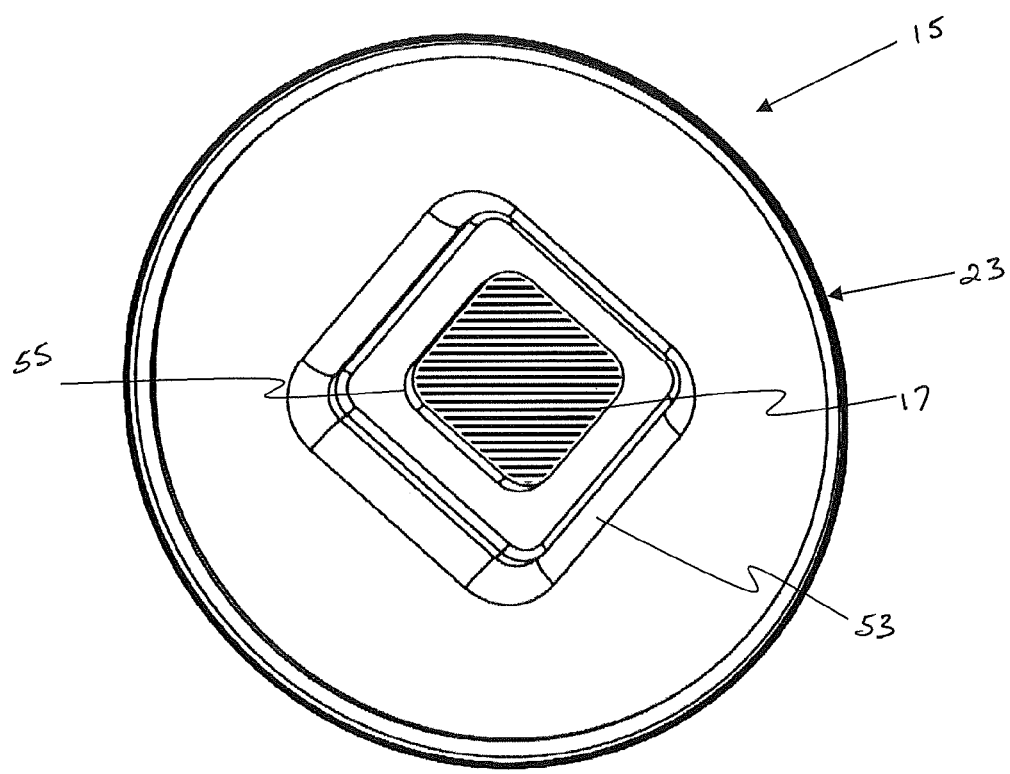
FIG. 20 is a rear cross sectional view of another preferred embodiment of a decorative accessory of our decorative case.

Additionally, the preferred embodiment shown in FIGS. 14-18 displays another configuration of apertures 5, 13 and decorative pieces 15. As shown in FIGS. 14-18, the decorative case 4 has a first plurality of apertures 5 that have a circular shape; while a second plurality of apertures 13 have a teardrop shape including a detent 27. The base 17 of the decorative piece 15 is sized and configured to fit through the apertures 5, 13 and has a circular shape. Furthermore, the base 17 is held in a locked engagement in a second overlap region 21 defined by an aperture 5 of the first plurality of apertures 5 and an aperture 13 of the second plurality of apertures 13 when the first 3 and second 11 sections are in the second position as shown in FIG. 16. The detent 27 allows the base 17 to nest within the apertures 5, 13 when the first and second sections are in the second position.

While the apertures 5, 13 and base 17 of the decorative piece 15 have been described by certain shapes and configurations, one of ordinary skill in the art would know that the apertures 5, 13 of the first and second sections and a decorative piece 15 and an associated base 17 may be formed in a variety of shapes and configurations such as but not limited to a square, diamond, polygon, tiered polygon, ellipse, or parabola, in order to provide for insertion and engagement of the decorative pieces 15 in the case.

Figure 21:
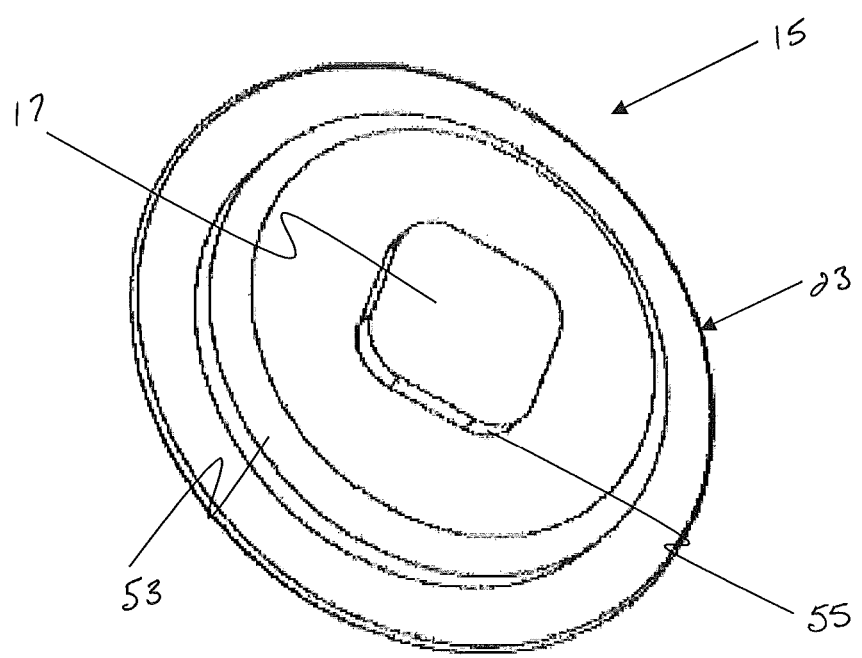
FIG. 21 is a rear perspective view of yet another preferred embodiment of a decorative accessory of our decorative case.

Examples of the different shapes and configurations that the base of the decorative piece may have are demonstrated in the embodiments shown in FIGS. 14-18, where the base 17 has a circular shape and in FIGS. 1-13 and 18-20 where the base 17 is shown as having a rectangular or diamond shape. Other examples are shown in the embodiments of FIGS. 21 and 22. In these embodiments the base may have a rectangular shape with a lip 55 at the corners of the rectangle to provide engagement with a corresponding aperture. The lip is sized and configured to nest the base about the edge or edges of a specific shape of aperture. In addition, FIG. 21 shows a decorative piece 15 with a ridge 53 have a rectangular shape and FIG. 22 shows a decorative piece 15 that has a circular shape. The ridge 53 can be sized and configured to fit a specific aperture shape as described above.

In another embodiment, a case may have a first section that has a rim around a perimeter of the first section such that the rim is sized and configured to engage and hold an object such as a book, a diary, a portfolio, a journal, or similar object. Further, one of ordinary skill would understand that the case may be made as a cover for a number of different objects having various shapes and sizes.

While we have shown and described certain present preferred embodiments of our electronic device case and have illustrated certain present preferred methods of making and using the same, it is to be distinctly understood that the invention is not limited thereto but may be otherwise variously embodied and practiced within the scope of the following claims.

We claim:

1. A case for a portable electronic device comprising:
a first section having a first plurality of apertures;
a second section having a second plurality of apertures, the second section being slideable in relation to the first section such that the second plurality of apertures overlaps the first plurality of apertures when the first section and the second section are in a first position or in a second position;
a rim around a perimeter of the first section, the rim for engaging and holding the portable electronic device;
a locking mechanism for engaging and holding the first section and the second section; and
a plurality of decorative pieces, each decorative piece having base; and
wherein the base of each decorative piece being sized and configured to pass through a first overlap region defined by an aperture of the first plurality of apertures and an aperture of the second plurality of apertures when the first and second sections are in the first position; and
wherein the base being sized and configured such that the base is held in a locked engagement in a second overlap region defined by an aperture of the first plurality of apertures and an aperture of the second plurality of apertures when the first and second sections are in the second position.

2. The case of claim 1 wherein the plurality of decorative pieces each having a top portion, and the top portion being sized and configured such that the top portion is not able to pass through either the first overlap region or the second overlap region, and wherein the base comprises a lip, the lip being sized and configured such that the lip is able to pass through the first overlap region and is not able to pass through the a second overlap region.

3. The case of claim 1 further comprising an indicator attached to the first section or the second section that indicates when the first and the second section are in the first position.

4. The case of claim 1 wherein each of the second plurality of apertures of the second section have a detent, and wherein the base of each of the decorative pieces is sized and configured to fit at least partially within the detent.

5. The case of claim 1 further comprising a slide grip attached to the first section or the second section that enables the first and second sections to be slid in relation to each other when a force is applied to the slide grip.

6. The case of claim 1 wherein the second plurality of apertures have a tiered diamond shape and wherein the second overlap region comprises a shape based on the tiered diamond shape of the second plurality of apertures.

7. The case of claim 1 wherein the rim being sized and configured to engage and hold the portable electronic device such that the portable electronic device is accessible to a user.

8. The case of claim 1 wherein the rim defining a cavity within which the portable electronic device fits and wherein the second section being located within the cavity and wherein the base is sized and configured to pass through the entire second section when the first and second sections are in the first position.

9. The case of claim 1 wherein the locking mechanism comprises a post on an inner surface of the first section and a tab on an inner surface of the second section, wherein the tab has at least one indentation that fits at least partially around the post.

10. A case for a portable electronic device comprising:
a first section having a first plurality of apertures;
a second section having a second plurality of apertures; and
wherein the second section is slideable in relation to the first section, the first section and the second section having an first position and a second position; and
a rim around a perimeter of the case, the rim for engaging and holding the portable electronic device;
a locking mechanism for engaging and holding the first section and the second section; and
wherein the first plurality of apertures overlap with the second plurality of apertures; and
wherein a first overlap region is defined by an aperture of the first plurality of apertures and an aperture of the second plurality of apertures when the first and second sections are in the first position; and
wherein a second overlap region is defined by an aperture of the first plurality of apertures and an aperture of the second plurality of apertures when the first and second sections are in the second position; and
wherein the first overlap region is larger than the second overlap region.

11. The case of claim 10 wherein the first section and the second section have a locking mechanism that is able to lock the first section and the second section in the first position or the second position.

12. The case of claim 10 wherein the locking mechanism comprises a post on an inner surface of the first section and a tab on an inner surface of the second section, wherein the tab has at least one indentation that fits at least partially around the post.

13. The case of claim 10 further comprising an indicator attached to the first section or the second section that indicates when the first section and the second section are in the first position.

14. The case of claim 10 wherein each of the second plurality of apertures of the second section have a teardrop shape and each of the first plurality of apertures of the first section have a circular shape.

15. The case of claim 10 wherein the locking mechanism comprises at least one component, the component being part of at least one of the first and the second section.

16. The case of claim 10 wherein the second plurality of apertures have a tiered diamond shape and wherein the second overlap region comprises a shape based on the tiered diamond shape of the second plurality of apertures.

* * * * *